US010168841B2

(12) United States Patent
Lee et al.

(10) Patent No.: US 10,168,841 B2
(45) Date of Patent: *Jan. 1, 2019

(54) TOUCH PANEL (71) Applicant: HANNSTOUCH SOLUTION INCORPORATED, Tainan (TW)

(72) Inventors: Hui-Shu Lee, Tainan (TW); Yao-Chih Chuang, Tainan (TW); Ching-Feng Tsai, Tainan (TW); Yu-Sheng Yen, Tainan (TW); Bin-Yu Shu, Tainan (TW)

(73) Assignee: HANNSTOUCH SOLUTION INCORPORATED, Tainan (TW)

( * ) Notice: Subject to any disclaimer, the term of this patent is extended or adjusted under 35 U.S.C. 154(b) by 436 days.

This patent is subject to a terminal disclaimer.

(21) Appl. No.: 14/944,185

(22) Filed: Nov. 17, 2015

(65) Prior Publication Data
US 2016/0070389 A1 Mar. 10, 2016

Related U.S. Application Data (62) Division of application No. 13/953,744, filed on Jul. 30, 2013, now Pat. No. 9,229,594.

(30) Foreign Application Priority Data

Dec. 26, 2012 (TW) .............................. 101150169 A (51) Int. Cl.
G06F 3/044 (2006.01)
G06F 3/041 (2006.01)

(52) U.S. Cl.
CPC ............ G06F 3/044 (2013.01); G06F 3/0412 (2013.01); G06F 2203/04103 (2013.01); G06F 2203/04107 (2013.01); G06F 2203/04804 (2013.01)

(58) Field of Classification Search
CPC ................... G06F 3/044; G06F 3/0412; G06F 2203/04804; G06F 2203/04107; G06F 2203/04103
USPC .................................................. 345/173–178
See application file for complete search history.

(56) References Cited

U.S. PATENT DOCUMENTS

| 2002/0067456 | A1* | 6/2002 | Tatsumi | G02F 1/1345 349/149 |
| 2003/0234770 | A1* | 12/2003 | MacKey | G06F 3/044 345/173 |
| 2005/0270467 | A1* | 12/2005 | Lee | G02F 1/1345 349/152 |
| 2011/0261003 | A1* | 10/2011 | Lee | G02F 1/13338 345/174 |
| 2012/0103777 | A1* | 5/2012 | Kang | G06F 3/044 200/600 |

(Continued)

Primary Examiner — Amit Chatly
(74) Attorney, Agent, or Firm — CKC & Partners Co., Ltd.

(57) ABSTRACT

A touch panel is disclosed, which includes a substrate, plural sensing units, plural wires, and a grounding component. The substrate includes a touch area and a wiring area surrounding the touch area. The sensing units are formed in the touch area. The wires are formed in the wiring area and are connected to the sensing units. The ground component is formed in the wiring area and includes plural hollow portions and conductive portions. At least parts of the hollow portions and at least parts of the conductive portions are alternatingly arranged. The situation of metal peeling can be prevented by slicing the grounding component in the touch panel.

12 Claims, 12 Drawing Sheets (56) References Cited

U.S. PATENT DOCUMENTS

2014/0132335 A1\* 5/2014 Rauhala ................ G06F 3/044
                                                                             327/517

\* cited by examiner

TOUCH PANEL

RELATED APPLICATIONS

The present application is a divisional application of U.S. application Ser. No. 13/953,744, filed Jul. 30, 2013, which claims priority to Taiwan Application Serial Number 101150169, filed Dec. 26, 2012, all of which are herein incorporated by reference.

BACKGROUND

Field of Invention

The invention relates to a touch panel. More particularly, the invention relates to a capacitive-type touch panel.

Description of Related Art

A touch and display device has advantages of being convenient for operation, fast response speed and reduced space. The touch and display device can provide users with an intuitive and convenient operation method, so that the touch and display device has become an important input interface, and is widely applied in various con electronics, such as e-books, personal digital assistants (PDAs), smart mobile communication devices, notebook computers, sales management systems and the like electronics.

Generally, the touch and display device includes a display panel and a transparent touch panel disposed above the display panel. The transparent touch panel adheres to the display panel to achieve touch and display functions at the same time. With the rapid development of the aforesaid touch hardware and the sensing accuracy thereof, attentions are gradually paid to a novel touch input interface which gradually takes the place of the conventional input device such as a keyboard and a mouse.

Therefore, industries want to improve the reliability of the touch panel effectively and simplify the manufacturing steps of the touch panel.

SUMMARY

The invention provides a touch panel for improving the reliability of the touch panel and simplifying the manufacturing steps.

An aspect of the invention provides a touch panel. The touch panel includes a substrate, plural sensing units, plural wires and a first grounding component. The substrate has a touch area and a wiring area surrounding the touch area. The sensing units are formed in the touch area. The wires are formed in the wiring area and are connected to the sensing units. The first grounding component is arranged in the wiring area. The first grounding component includes plural first hollow portions and plural first conductive portions. The first hollow portions and at least parts of the first conductive portions are alternatingly arranged.

The wire width of the first conductive portions is preferably smaller than 60 µm, and the wire spacing of the first hollow portions is also preferably smaller than 60 µm. The area ratio of the first conductive portions to the first hollow portions is about 0.6-1.4. The touch panel optionally further includes a reinforcing rib connected to the first conductive portions. The first conductive portions and the wires are formed in the same layer as being manufactured under the same photo mask. Part of the substrate is exposed from the hollow portion. The touch panel may further include a test pad formed in the wiring area, wherein the test pad includes at least one second conductive portion and second hollow portion. The first grounding component may be formed at the periphery of the wires. The touch panel may further include a second grounding component formed at the inner sides of the wires, and the second grounding component is disposed between the test pad and the wires. The second grounding component includes plural third hollow portions and plural third conductive portions, in which at least parts of the third hollow portions and at least parts of the third conductive portions are alternatingly arranged. The first hollow portions may be formed as patterns with a grating, matrix or zigzag form.

Another aspect of the invention provides a touch panel, which includes a substrate, a shielding layer formed at the periphery of the substrate, a sensitive layer formed on the substrate, a signal wire layer formed on the sensitive layer and the shielding layer, and a protecting layer formed on the sensitive layer and the signal wire layer. The sensitive layer includes plural sensing units.

The sensitive layer may include a first transparent conducting layer, an insulation layer, and a second transparent conducting layer. The first transparent conducting layer is formed on the substrate. The first transparent conducting layer includes plural bridge structures. The insulation layer is disposed on the first transparent conducting layer and the shielding layer, in which part of the insulation layer is formed on the bridge structure. The second transparent conducting layer is formed on the insulation layer and includes plural electrode units. At least parts of the electrode units are connected electrically with each other through the bridge structure. The insulation layer isolates and electrically insulates the first transparent conducting layer and the second transparent conducting layer. The signal wire layer is formed on the insulation layer and is disposed between the second transparent conducting layer, the insulation layer and the protecting layer. The signal wire layer further includes a grounding component formed on the shielding layer. The grounding component includes plural hollow portions and plural conductive portions, in which at least parts of the hollow portions and at least parts of the conductive portions are alternatingly arranged.

Alternatively, the sensitive layer may include a transparent conducting layer and an insulation layer. The transparent conducting layer is formed on the substrate, including plural electrode units. The insulation layer is formed on the transparent conducting layer. The signal wire layer is formed on the insulation layer and includes plural bridge structures. At least parts of the electrode units are electrically connected to each other through the bridge structures, and the insulation layer isolates electrically insulates the transparent conducting layer and the bridge structures. The signal wire layer further includes a grounding component formed on the shielding layer. The grounding component includes plural hollow portions and plural conductive portions, wherein at least parts of the hollow portions and at least parts of the conductive portions are alternatingly arranged.

In the touch panel provided by the invention, in addition to slicing metal blocks with large areas (such as the grounding component) to prevent the situation of metal peeling, the reliability of the touch panel is improved and the manufacturing steps of the same is simplified by changing the sequence of the layer lamination structure.

BRIEF DESCRIPTION OF THE DRAWINGS

In order to make the foregoing as well as other aspects, features, advantages, and embodiments of the present invention more apparent, the accompanying drawings are described as follows.

DETAILED DESCRIPTION

The spirit of the invention will be described clearly through the drawings and the detailed description as follows. Any of those of ordinary skills in the art can make modifications and variations from the technology taught in the invention after understanding the embodiments of the invention, without departing from the sprite and scope of the invention.

Figure 1A:
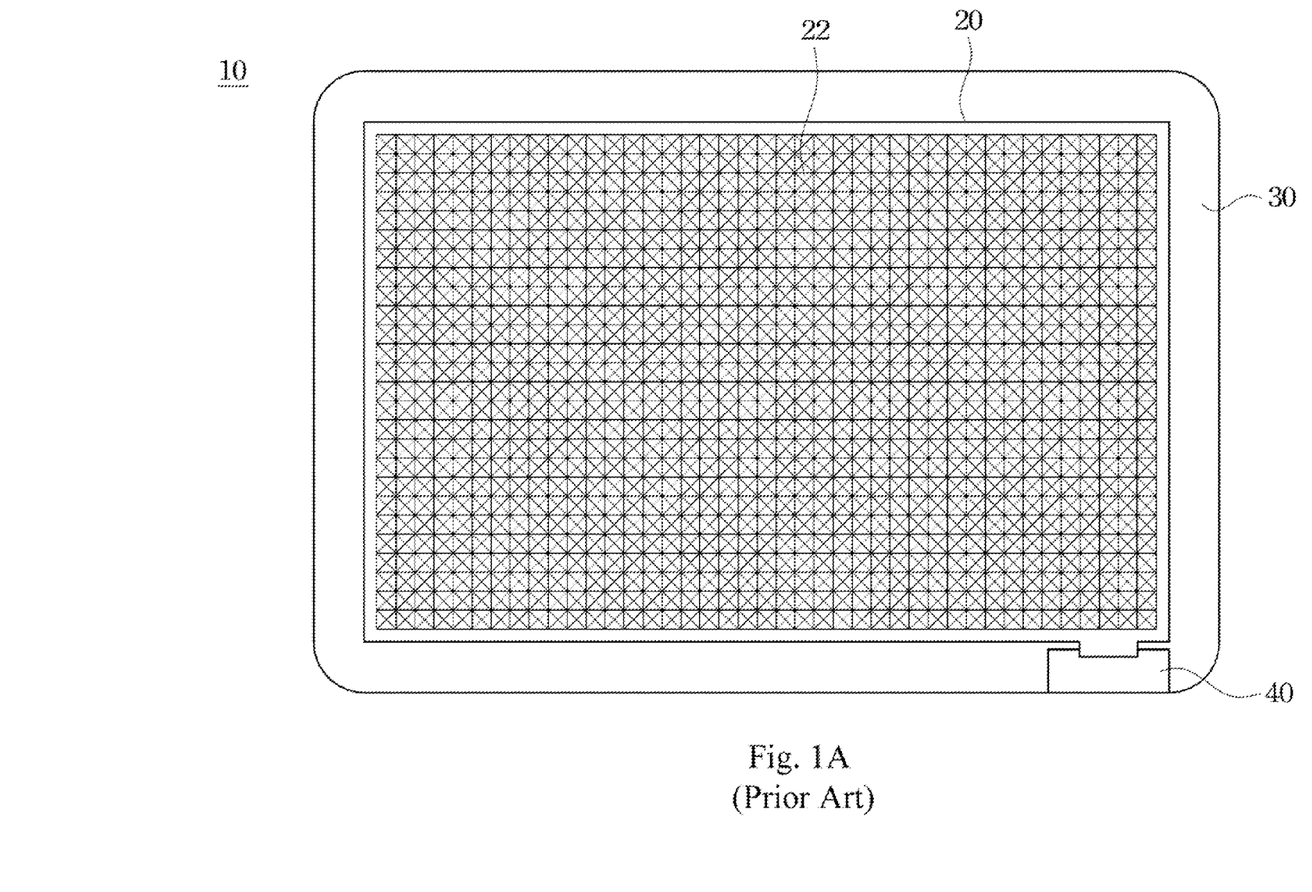
FIG. 1A is a top view of an embodiment of a conventional touch panel.
Figure 1B:
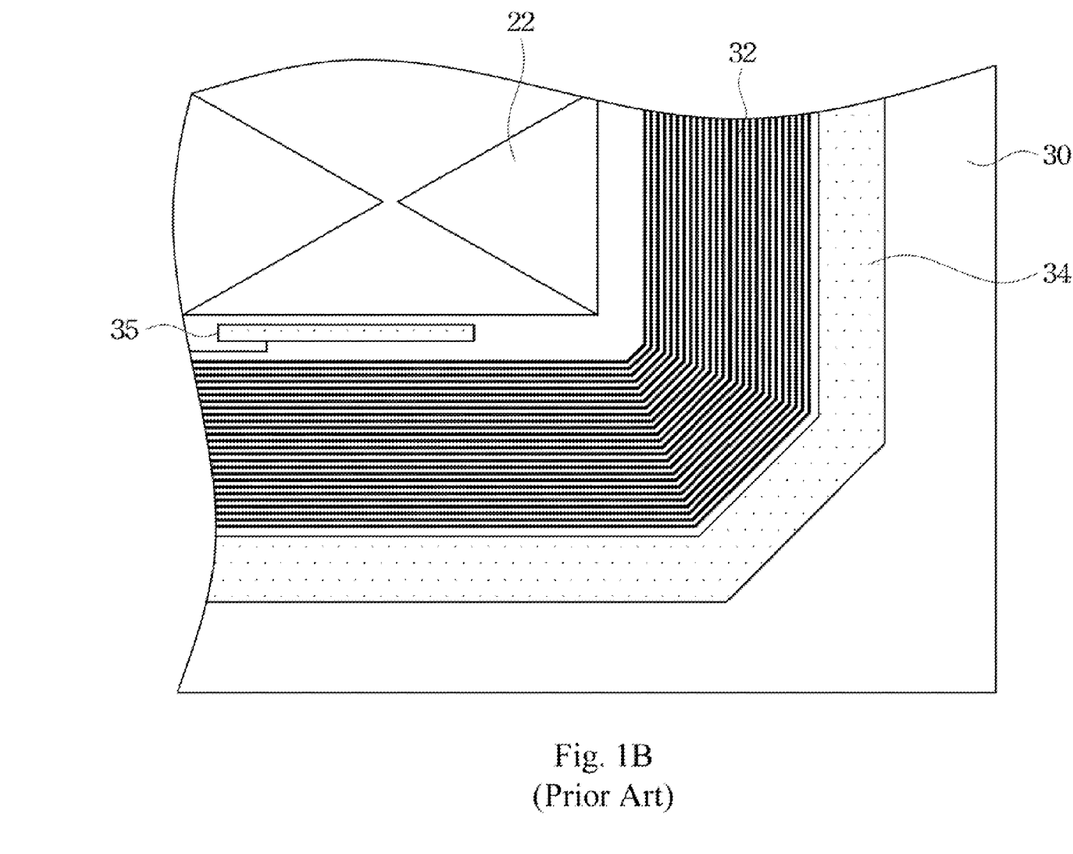
FIG. 1B is a partially enlarged view of FIG. 1A.

References are made to FIGS. 1A and 1B. FIG. 1A is a top view of an embodiment of a conventional touch panel, and FIG. 1B is a partially enlarged view of FIG. 1A. As shown in FIG. 1A, a touch panel 10 includes a touch area 20 and a wiring area 30 surrounding the touch area 20. The touch area 20 is an active area (AA area) corresponding to a display panel. The touch area 20 includes plural sensing units 22, and the wiring area 30 is passed through by wires, so that the wires connect the sensing unit 22 and a control circuit board 40. As shown in FIG. 1B, in order to prevent damage to the sensing units 22 caused by electrostatic discharge (ESD), in addition to that wires 32 are formed in the wiring area 30, a grounding component 34 is further formed at the periphery of the wires 32, so as to provide electrostatic defending and grounding functions. Additionally, the touch panel 10 also includes a test pad, such as the test pad 35 shown in FIG. 1B. Generally, the test pad 35 is formed at inner sides of the wires 32, and the grounding component 34 is disposed at the outer sides (periphery) of the wires 32.

However, since the grounding component 34 typically has a large area, and the material of the grounding component 34 has a poor adherence to the substrate, the situation of peeling of the grounding component 34 may easily caused, which affects the yield of the products. Furthermore, due to different manufacture processes, the grounding component 34 may be arranged on substrates of different materials, and these designs affect the adherence of the grounding component 34 to the substrate. Therefore, one of the problems to be solved by the invention is how to ensure the adherence of the grounding component 34 to different substrates.

Figure 2:
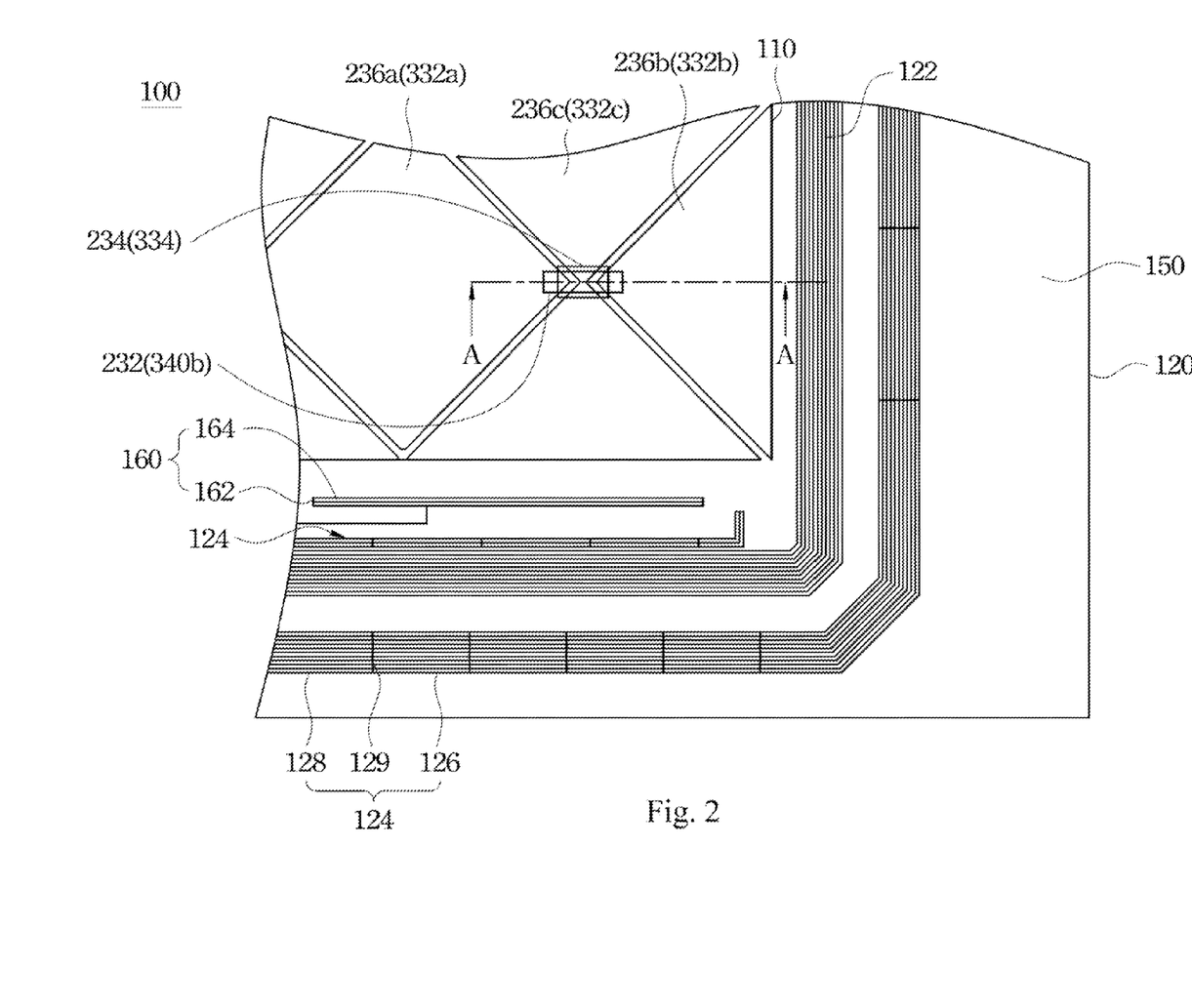
FIG. 2 is a partially enlarged view of an embodiment of the touch panel of the invention.

FIG. 2 is a partially enlarged view of an embodiment of the touch panel of the invention. The touch panel 100 includes a touch area 110 and a wiring area 120 surrounding the touch area 110. The touch area 110 includes plural sensing units used for generating a signal indicating the press/touch position. The wiring area 120 includes plural wires 122 and grounding components 124. The wires 122 are used for connecting the sensing units and the control circuit board. The grounding components 124 are used for providing electrostatic defending and grounding functions. It should be specially noted that, although in this embodiment, as shown in FIG. 2, the grounding components 124 are formed both at the inner sides and the outer sides (periphery) of the wires 122, in other embodiments, the grounding component 124 may only formed at the inner sides or outer sides of the wires 122. The grounding component 124 formed at the inner sides of the wires 122 is disposed between the wires 122 and the test pad 160, and the grounding component 124 formed at the outer sides of the wires 122 surrounds the wires 122.

The grounding component 124 is formed on the substrate 150. The grounding component 124 includes plural hollow portions 126 and plural conductive portions 128. The hollow portions 126 and the conductive portions 128 are alternatingly arranged. That is, adjacent conductive portions 128 are isolated from each other through one hollow portion 126. The conductive portions 128 can be formed on the substrate 150 through a lithography process. Part of the substrate 150 is exposed from the hollow portions 126 of the grounding component 124. The conductive portions 128 and the wires 122 are formed in the same layer as being manufactured under the same photo mask. Patterns of the hollow portions 126 and conductive portions 128 can be changed with different designs of the photo mask, and it only requires that the hollow portions 126 and the conductive portions 128 are alternatingly arranged in the grounding component 124.

Figure 3A:
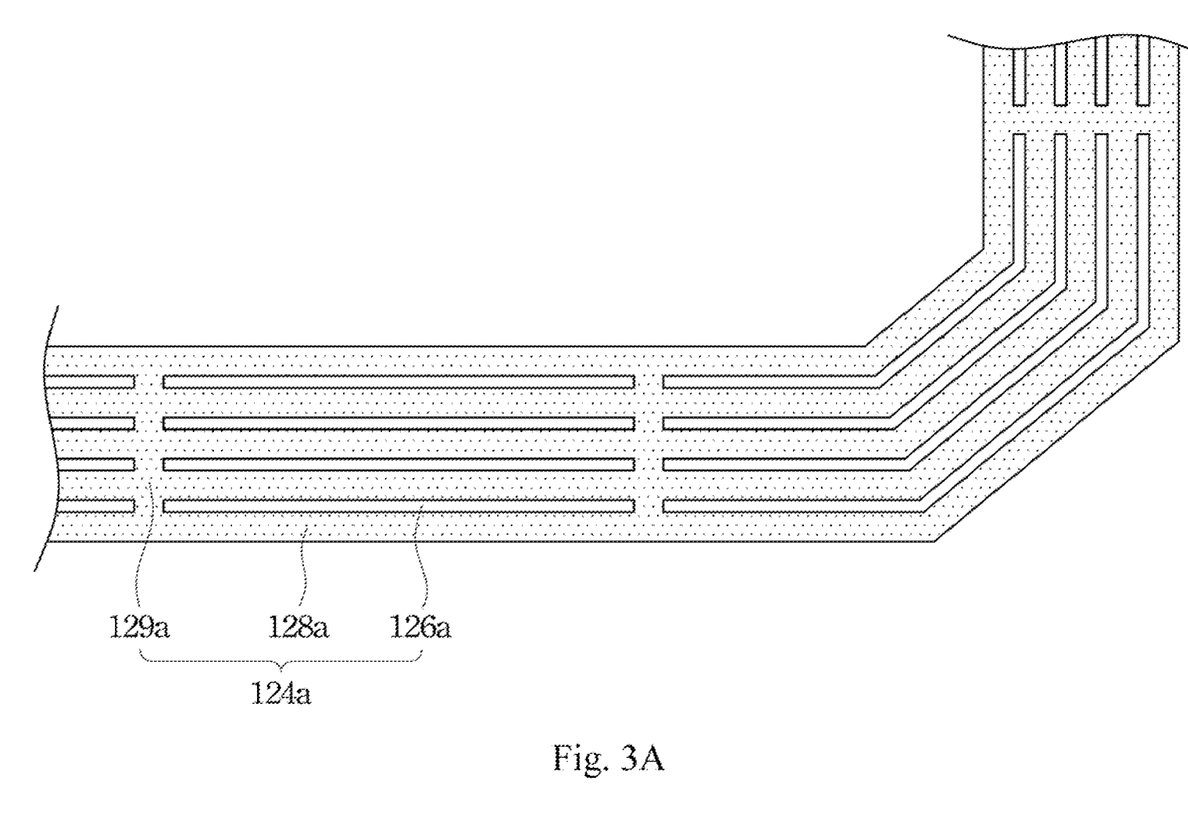
FIGS. 3A-3D are schematic views of different embodiments of the grounding component of the invention.
Figure 3B:
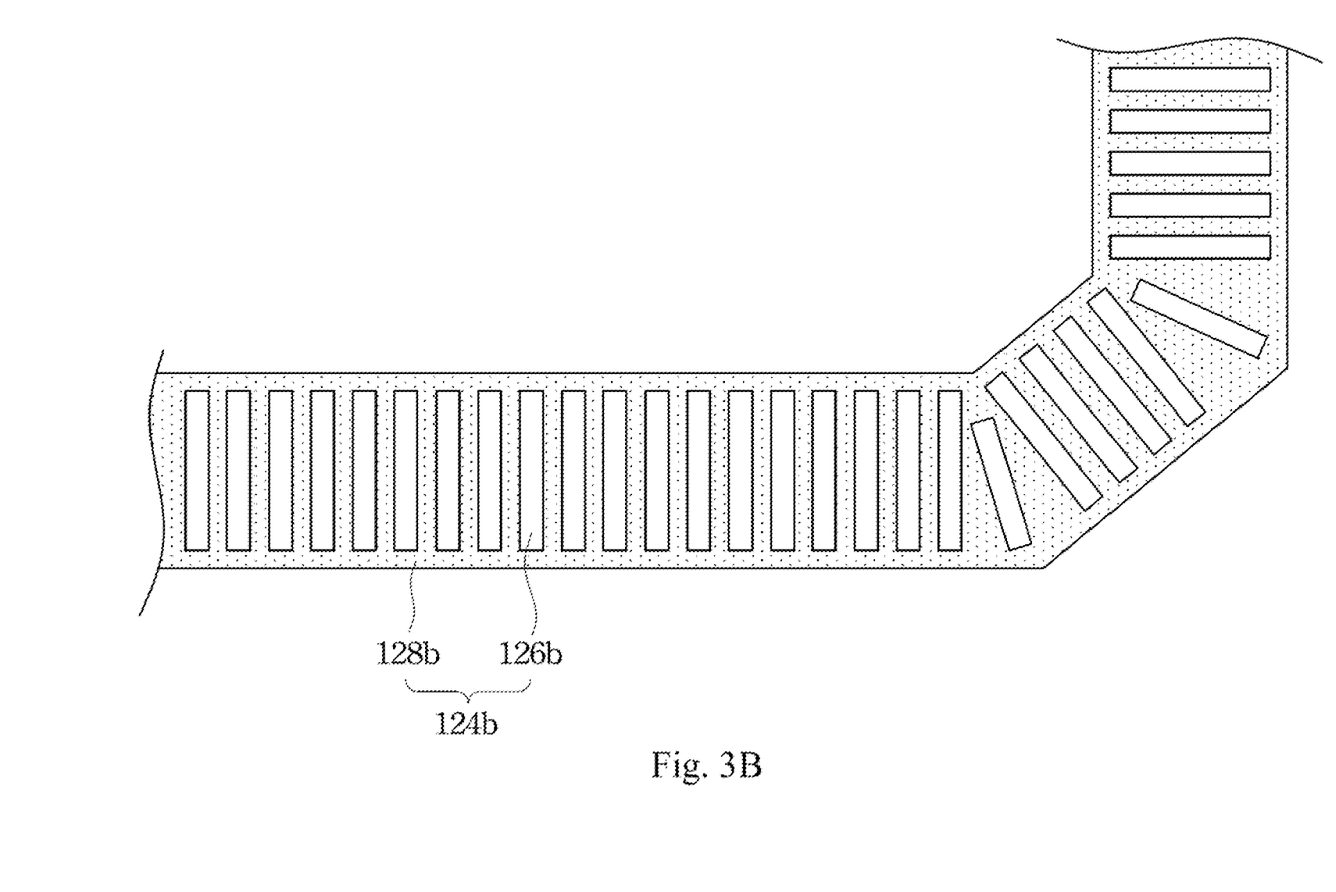
Figure 3C:
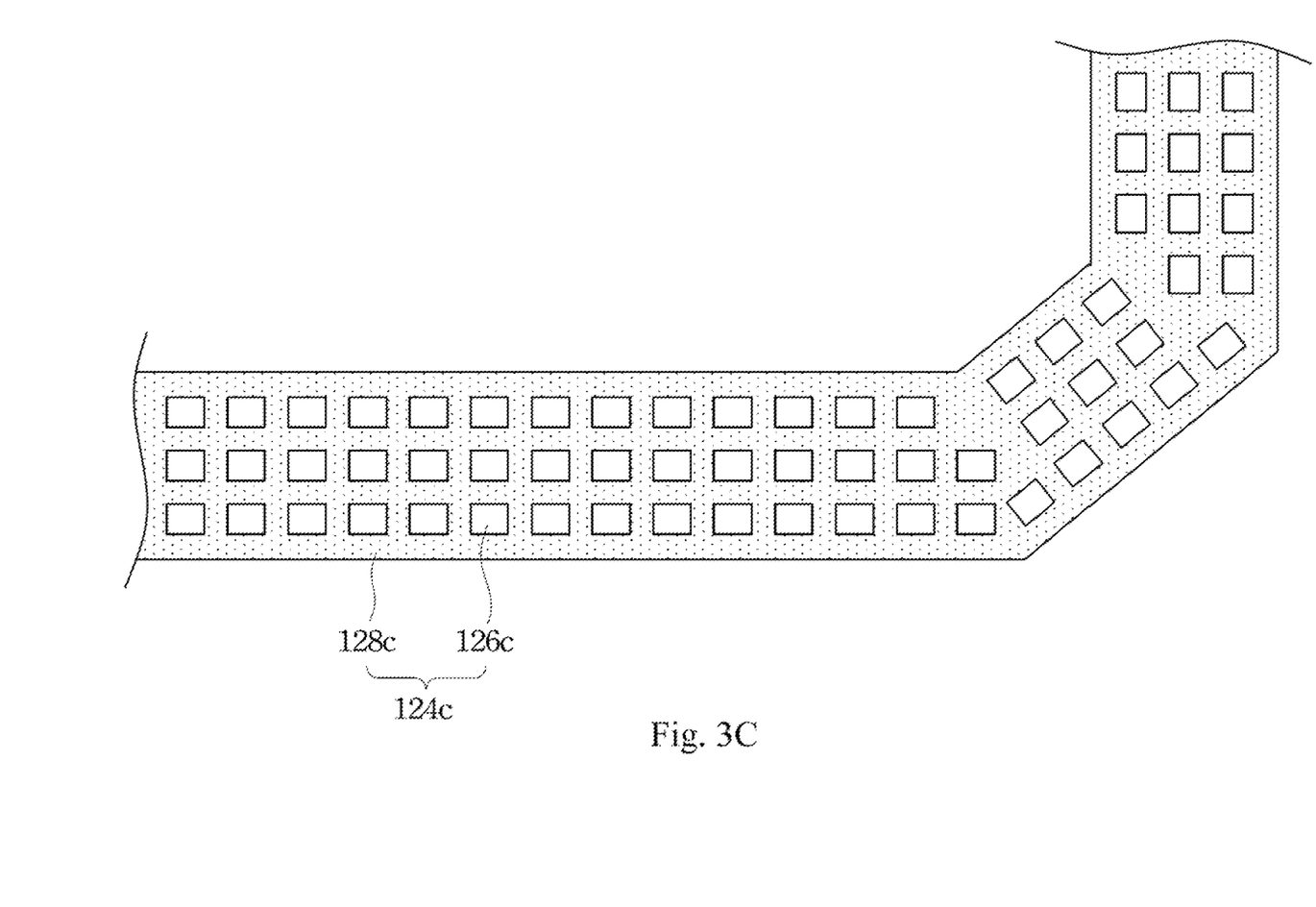

In this embodiment, the conductive portions 128 approximately have long-strip shapes, and the hollow portions 126 arranged alternatingly with the conductive portions also have long-strip shapes. The long-strip shaped conductive portions 128 can be arranged in parallel to each other, and each of the hollow portions 126 is disposed between each two adjacent conductive portions 128, so as to isolate the adjacent and parallel conductive portions 128. Since the shape of the conductive portion 128 of the embodiment is presented as a structure with plural long and narrow strips, in order to improve the structure strength of the grounding component 124, the grounding component 124 may further include at least one reinforcing rib 129. Therefore, parallel arranged long and narrow conductive portions 128 can be connected to each other through the reinforcing ribs 129, such that the conductive portions 128 are electrically conducted with each other, so as to improve the structure strength of the grounding component 124. The conductive portions 128 and the reinforcing ribs 129 can be integrated as a whole by using the same photo mask. That is, the conductive portions 128 and the reinforcing ribs 129 are manufactured in the same metal layer. As shown in FIG. 3A, the conductive portions 128a and the reinforcing ribs 129a are formed on the same layer by using the same photo mask.

The grounding component 124 is provided with hollow portions 126, so as to prevent the situation that conductive portions 128 with a large area adhere to the substrate 150, by slicing the grounding component 124. In this embodiment, reducing the contact area between the conductive portions 128 and the substrate 150 in an unit area can effectively improve the adherence of the conductive portions 128 to the substrate 150, reduce the problem in the prior art of metal peeling from the grounding component, and improve the yield and reliability of the product.

As described above, the grounding component 124 mainly includes a hollow portion 126 and a conductive portion 128. As long as the conductive portion 128 with a large area does not exist in the grounding component 124, the function of preventing the peeling of the conductive portion 128 from the substrate 150 can be achieved by slicing the ground component 124. More particularly, in this embodiment, a wire width of the conductive portion 128 included in the grounding component 124 is smaller than 60 μm, and the wire spacing (width) of the hollow portion 126 included in the grounding component 124 is also smaller than 60 μm. Therefore the grounding component 124 is prevented from being presented as a lumped metal layer with a large area, as shown in FIG. 1B. In particular, the wire spacing of the hollow portion 126 and the wire width of the conductive portion 128 can be determined according to the processing capability. Generally, the wire spacing of the hollow portion 126 and the wire width of the conductive portion 128 are respectively from about 30 μm to 60 μm. In this embodiment, the area ratio of the hollow portion 126 to the conductive portion 128 is 1:1, but the invention is not limited to this. In other embodiments, the area ratio of the hollow portion 126 to the conductive portion 128 may be defined as 0.6-1.4, and the area ratio of the hollow portion 126 to the conductive portion 128 can be adjusted according to conducting properties of the material, circuit layout, processing capability and the like.

It should be noted that, in the touch panel 100, in addition to the grounding component 124, other metal layers or conductive components with large areas can also be sliced using the same method, to prevent the problem of peeling of a metal layer with a large area from the substrate 150. For example, as shown in FIG. 2 the test pad 160 on the touch panel 100 can also be sliced, so that the test pad 160 also includes the conductive portion 162 and the hollow portion 164 arranged alternatingly. The wire width of the conductive portion 162 is also not greater than 60 μm. In this embodiment, the conductive portion 162 and the hollow portion 164 are arranged in parallel to each other linearly, and the hollow portion 164 is used for slicing the test pad 160 with a large area to accordingly form the conductive portion 162. It should be noted that, the main characteristic of the slicing in the invention is forming at least one hollow portion on a metal layer with a large area and enclosed periphery, so as to reduce the area of the metal layer, and achieve the effect that the metal layer cannot be easily peeled from the substrate.

The grounding component 124 and the test pad 160 can have different pattern arrangement as being manufactured under different design of photo masks, and it is only required to slice the metal layer with the large area into a metal layer having plural hollow portions, which will be illustrated through embodiments hereafter.

References are made to FIGS. 3A-3O. FIGS. 3A-3D are schematic views of different embodiments of the grounding component of the invention. In the embodiment as shown in FIG. 3A, the grounding component 124a includes plural conductive portions 128a, plural hollow portions 126a and plural reinforcing ribs 129a The conductive portions 128a and the hollow portions 126a are strips approximately in parallel to each other. The conductive portions 128a are isolated from each other through the hollow portions 126a, and the reinforcing ribs 129 are perpendicular to the conductive portions 128a and the hollow portions 126a. In this embodiment, the conductive portions 128a, reinforcing ribs 129 and hollow portions 126a may have the same or different widths. In the embodiment shown in FIG. 3B, the grounding component 124b includes plural hollow portions 126b and plural conductive portions 128b. The hollow portions 126b are approximately line segments parallel to each other, so that the conductive portions 128b are presented as patterns with grating forms. In the embodiment shown in FIG. 3C, the grounding component 124c includes plural hollow portions 126c and plural conductive portions 128c. The hollow portion 126c may include plural rectangle patterns arranged in a matrix form, so that the conductive portions 128b are presented as patterns with a clathrate form.

Figure 3D:
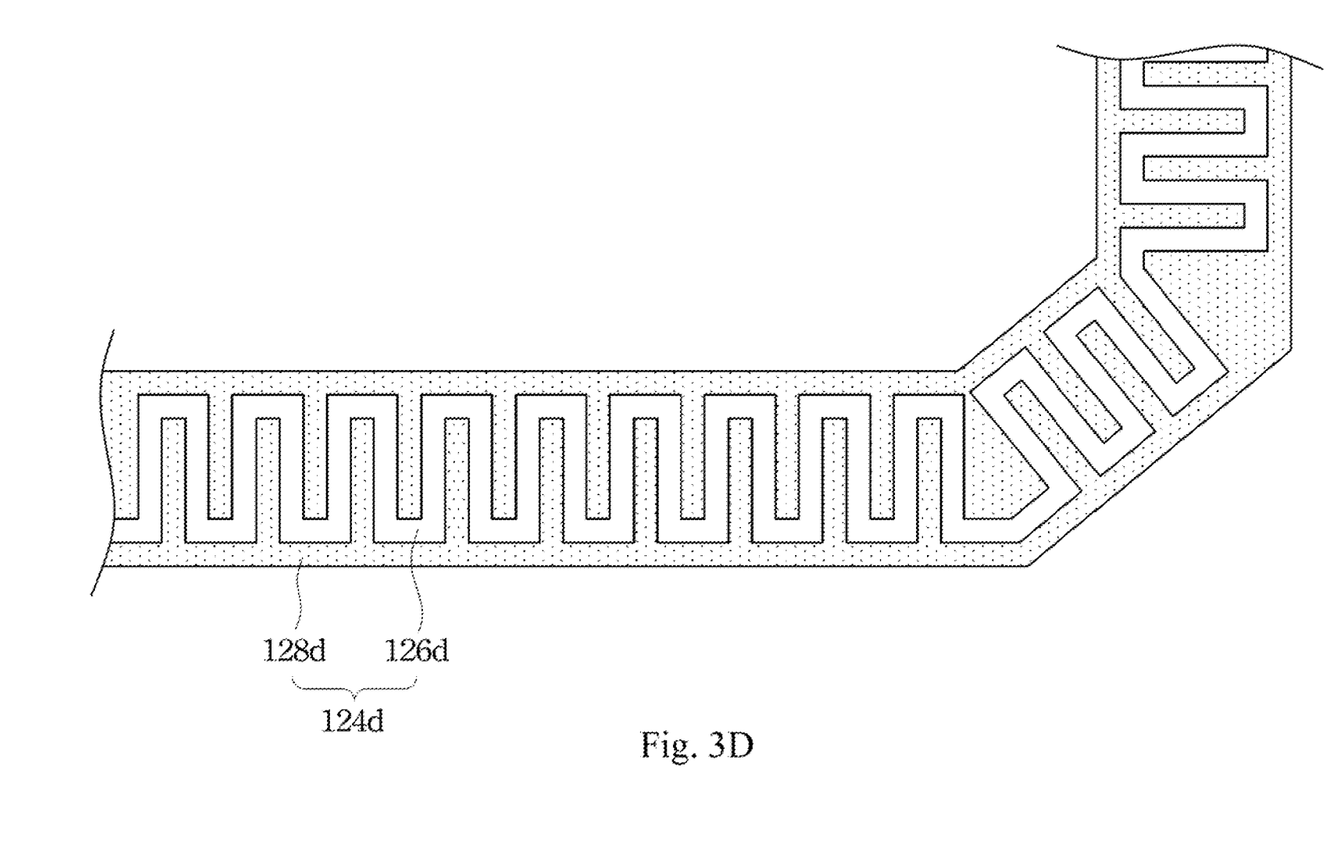

Additionally, in the embodiment shown in FIG. 3D, the grounding component 124d includes plural hollow portions 126d and plural conductive portions 128d. The hollow portions 126d and the conductive portions 128d are arranged alternatingly, and the hollow portions 126d are presented as patterns with a zigzag form.

As described above, in principle in the embodiments shown in FIGS. 3A-3D, the area ratio of the hollow portions to the conductive portions is preferably designed as 0.6-1.4.

The aforesaid FIGS. 3A-3D are only used for illustrating the possible patterns formed after the grounding component is sliced, but not intended to limit the pattern of the grounding component. The aforesaid pattern may also be applied to the test pad or other conductive components with large areas, which will not be illustrated here anymore.

According to the design of layer lamination sequence, in a conventional capacitive-type touch panel, the signal wire layer is first manufactured for delivering the touch signal and control signal, and transparent conducting layers of an x-axis electrode and a y-axis electrode are manufactured. Since the etching solution applied in the transparent conducting layer may etch the signal wire layer, it usually needs to cover a transparent conducting layer over the signal wire layer to prevent the etching solution effect, which increases the complexity of the manufacture process. In view of the above, another aspect of the invention provides a layer lamination design of a capacitive-type touch panel, which can simplify the complexity of the process design and improve the productivity.

Figure 4A:
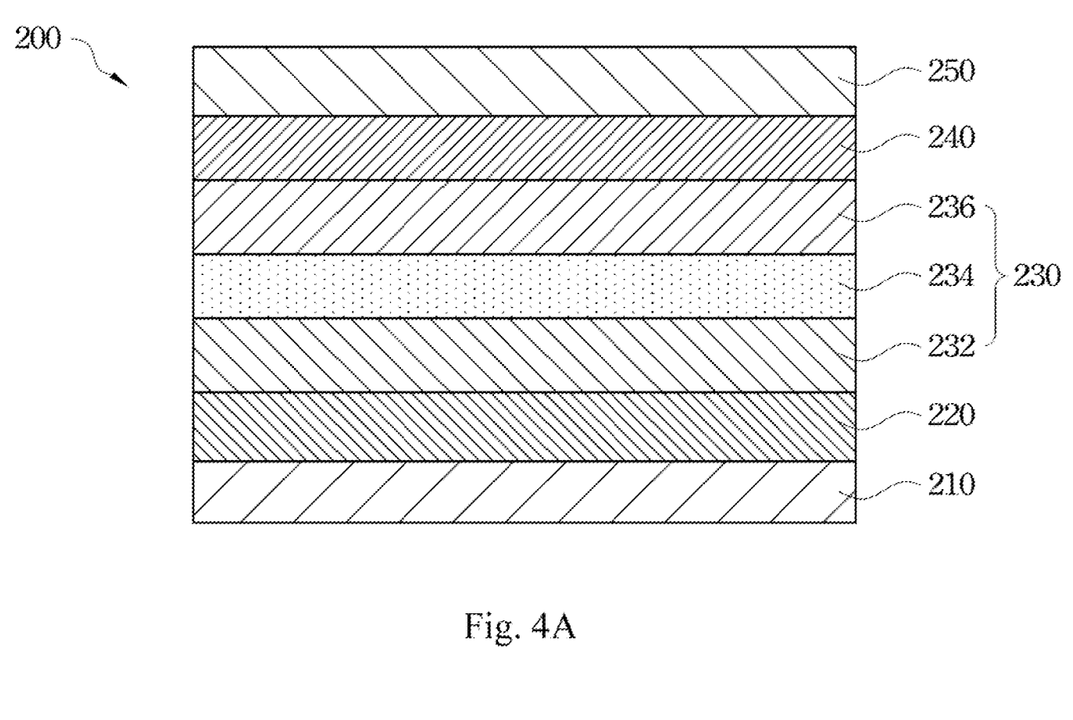
FIG. 4A is a schematic view of a layer lamination structure according to an embodiment of another aspect of the touch panel of the invention.

FIG. 4A, is a schematic view of a layer lamination structure according to an embodiment of a further aspect of the touch panel of the invention. The lamination structure applied in the touch panel 200 includes a substrate 210, a shielding layer 220 formed on the substrate 210, a sensitive layer 230 formed on the shielding layer 220, a signal wire layer 240 formed on the sensitive layer 230, and a protecting layer 250 formed on the signal wire layer 240. The sensitive layer 230 includes plural sensing units including a first transparent conducting layer 232, an insulation layer 234 and a second transparent conducting layer 236. The first transparent conducting layer 232 is regarded as a bridge layer, and the second transparent conducting layer 236 is regarded as the x-axis electrode and the y-axis electrode.

Figure 4B:
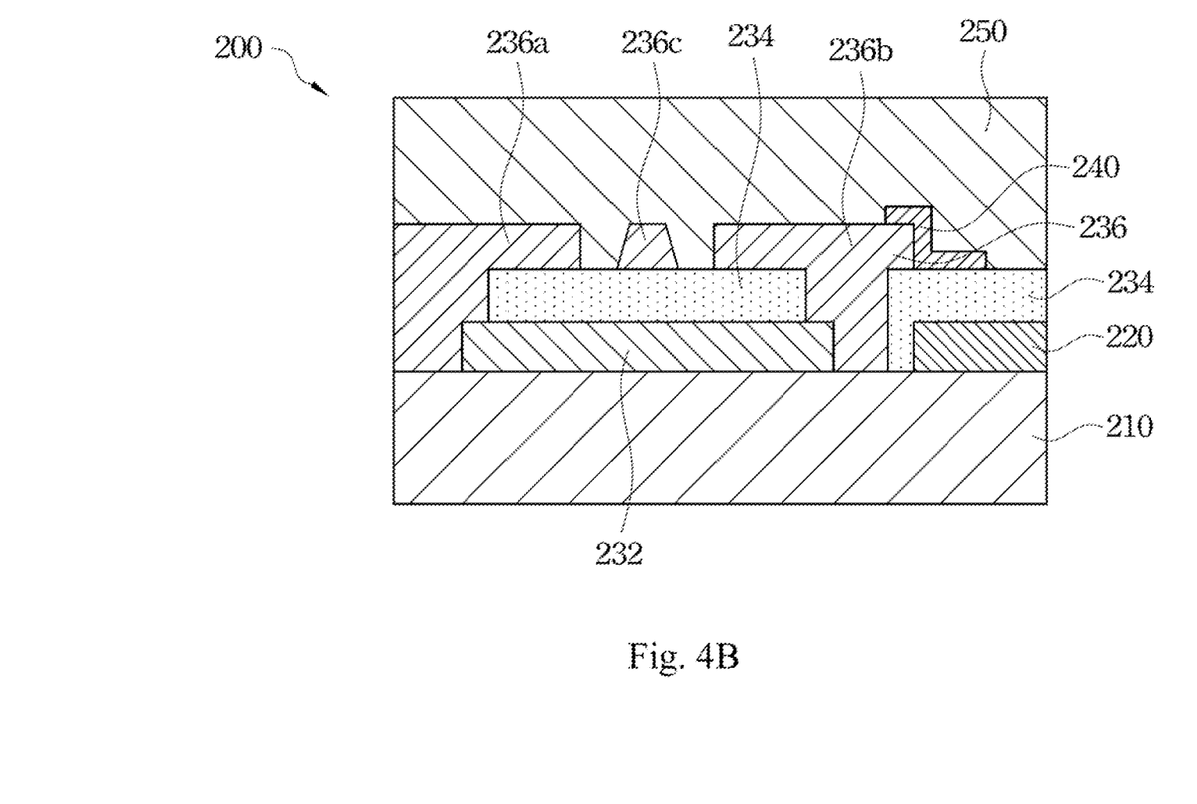
FIG. 4B and FIG. 4C are cross-sectional views of different embodiments of the touch panel shown in FIG. 4A.

Reference is made to FIGS. 2 and 4B. FIG. 4B is a cross-sectional view of the touch panel 200 shown in FIG. 4A, and the profile position thereof can be referred to the line segment A-A shown in FIG. 2. In the touch panel 200, the substrate 210 may be a silicon substrate or a transparent substrate manufactured of other materials, and the shielding layer 220 is formed in the wiring area at the periphery of the substrate 210 through a lithography process. The shielding layer 220 may be a black photoresist layer. Subsequently, also through the lithography process, the first transparent conducting layer 232 is formed on the substrate 210; the insulation layer 234 is formed on the first transparent conducting layer 232; and the second transparent conducting layer 236 is formed on the insulation layer 234 and the substrate 210. The second transparent conducting layer 236 is regarded as the x-axis electrode and the y-axis electrode. In this embodiment, the second transparent conducting layer 236 includes plural electrode units 236a, 236b and 236c with rhombus or other forms. These electrode units 236a, 236b and 236c are arranged in lines or series. The electrode units 236c in alternate lines are connected to each other in the longitudinal direction (the direction of y-axis), and the electrode units 236a and 236b at left and right of the electrode units 236c arranged in lines in the lateral direction (the direction of x-axis) are independent (being insulated electrically to each other) and electrically connected to each other via the first transparent conducting layer 232. The pattern of the first transparent conducting layer 232 is as a bridge structure with long and narrow strip forms, so as to bridge-connect these independent electrode units 236a and 236b isolated by the insulation layer 234 in the lateral direction. As such, electrode series consisting of the electrode units at the direction of x-axis and electrode series consisting of the electrode units at the direction of y-axis can be obtained, and the electrode series at the direction of x-axis can be electrically isolated from the electrode series at the direction of y-axis through the insulation layer 234. It should be specially noted that, in this embodiment, as shown in FIG. 4B, an insulation island formed by the insulation layer 234 is correspondingly disposed on each bridge structure formed by the first transparent conducting layer 232. These insulation islands and these bridge structures are arranged as a matrix on the substrate 210.

In other words, the first transparent conducting layer 232 of the invention includes plural bridge structures. The electrode units 236a and 236b at the lateral direction of the second transparent conducting layer 236 are electrically connected to each other through the plural bridge structures. The insulation layer 234 is used for isolating the first transparent conducting layer 232 and the second transparent conducting layer 236.

Figure 4C:
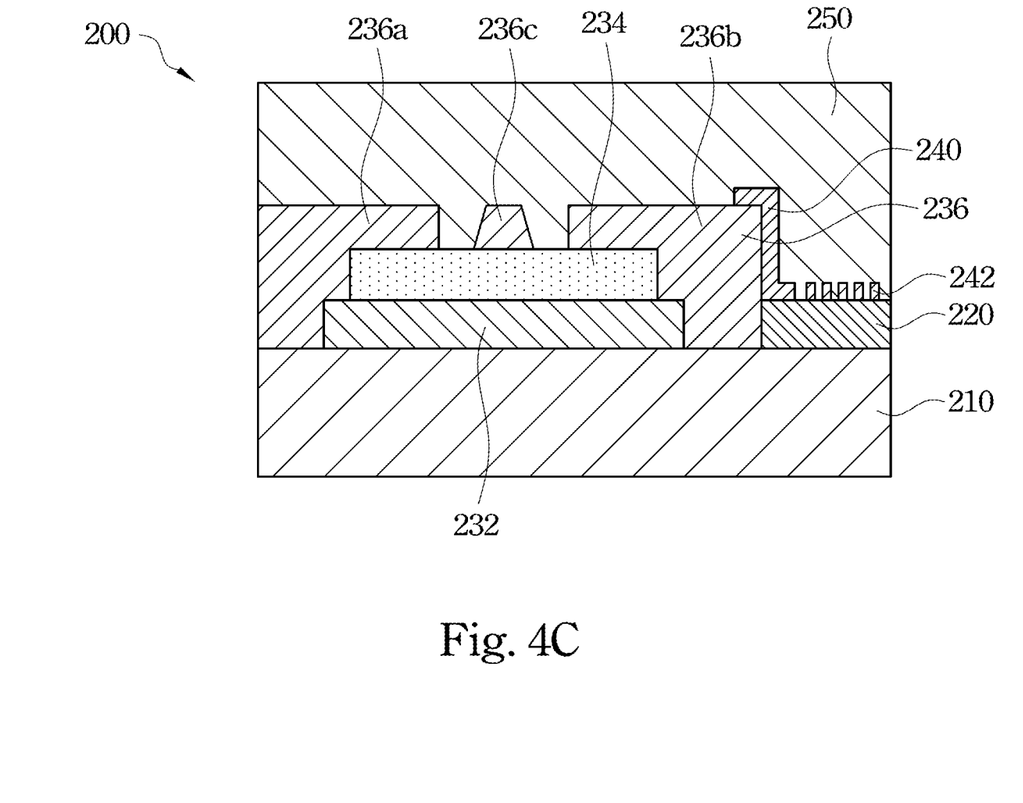

Part of the insulation layer 234 is formed on the shielding layer 220. The signal wire layer 240 is formed on the sensitive layer 230. In particular, the signal wire layer 240 is formed on the second transparent conducting layer 236 and is disposed on the part of the insulation layer 234 formed on the shielding layer 220. The signal wire layer 240 includes wires, test pads and grounding components as shown in FIGS. 2-3D, so that the sensitive layer 230 can be electrically connected to an external circuit through the signal wire layer 240. Finally, the protecting layer 250 is further formed on surfaces of the sensitive layer 230 and the signal wire layer 240. In other words, the signal wire layer 240 is formed on the insulation layer 234, and is disposed between the second transparent conducting layer 236, the insulation layer 234 and the protecting layer 250. It should be noted that, in this embodiment, as shown in FIG. 4B, the insulation layer 234 covers over the shielding layer 220. That is, at least a portion of the insulation layer 234 is disposed between the electrode unit 236b, the signal wire layer 240 and the shielding layer 220. However, in other embodiments, as shown in FIG. 4C, the shielding layer 220 may not be provided with an insulation layer covered thereon. In other words, the signal wire layer 240 directly covers over the electrode unit 236b and the shielding layer 220.

As illustrated in FIG. 4C, the signal wire layer 240 may include a grounding component 242 directly formed on the shielding layer 220, and the grounding component includes plural hollow portions and plural conductive portions. The hollow portions and conductive portions are arranged alternatingly.

In this embodiment, by adjusting the layer lamination sequence of the touch panel 200, the signal wire layer 240 is designed as manufactured after the sensitive layer 230. Since the signal wire layer 240 is usually composed of a metal layer, via the provided layer lamination sequence, the etching solution for etching the transparent conducting layer does not damage the metal layer manufactured thereafter, which prevent the problem of the prior art that the metal layer is eroded by the etching solution.

Figure 5A:
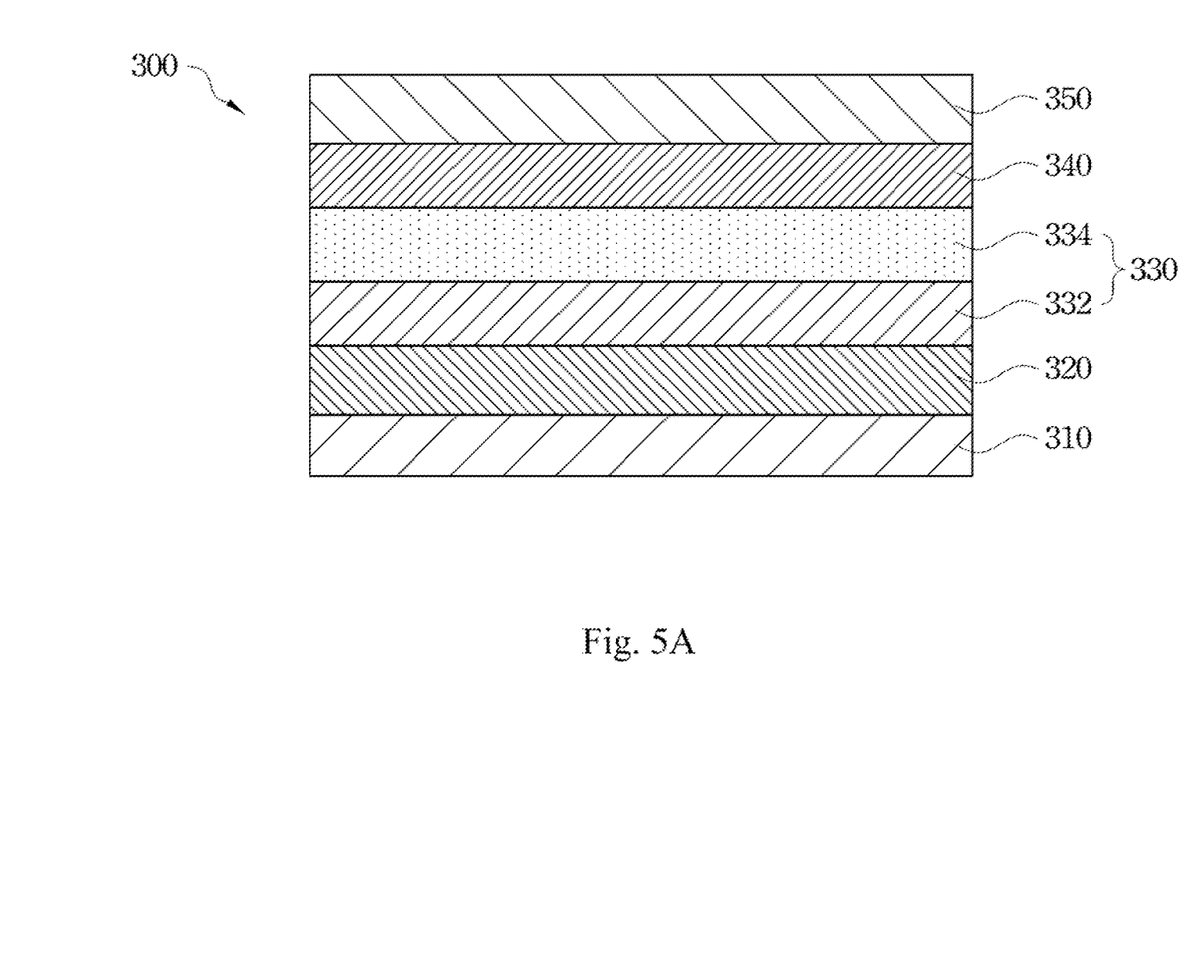
FIG. 5A is a schematic view of a layer lamination structure according to an embodiment of a further aspect of the touch panel of the invention.

FIG. 5A, is a schematic view of a layer lamination structure according to an embodiment of a further aspect of the touch panel of the invention. The lamination structure applied in the touch panel 300 includes a substrate 310, a shielding layer 320 formed on the substrate 310, a sensitive layer 330 formed on the shielding layer 320, a signal wire layer 340 formed on the sensitive layer 330 and a protecting layer 350 formed on the signal wire layer 340. The sensitive layer 330 includes plural sensing units consisting of a transparent conducting layer 332 and an insulation layer 334. The transparent conducting layer 332 is regarded as the x-axis electrode and the y-axis electrode. The signal wire layer 340 includes the wires, grounding components and test pads. In addition, the signal wire layer 340 can further include plural bridge structures which are used to electrically connect the electrode units of the transparent conducting layer 332.

Figure 5B:
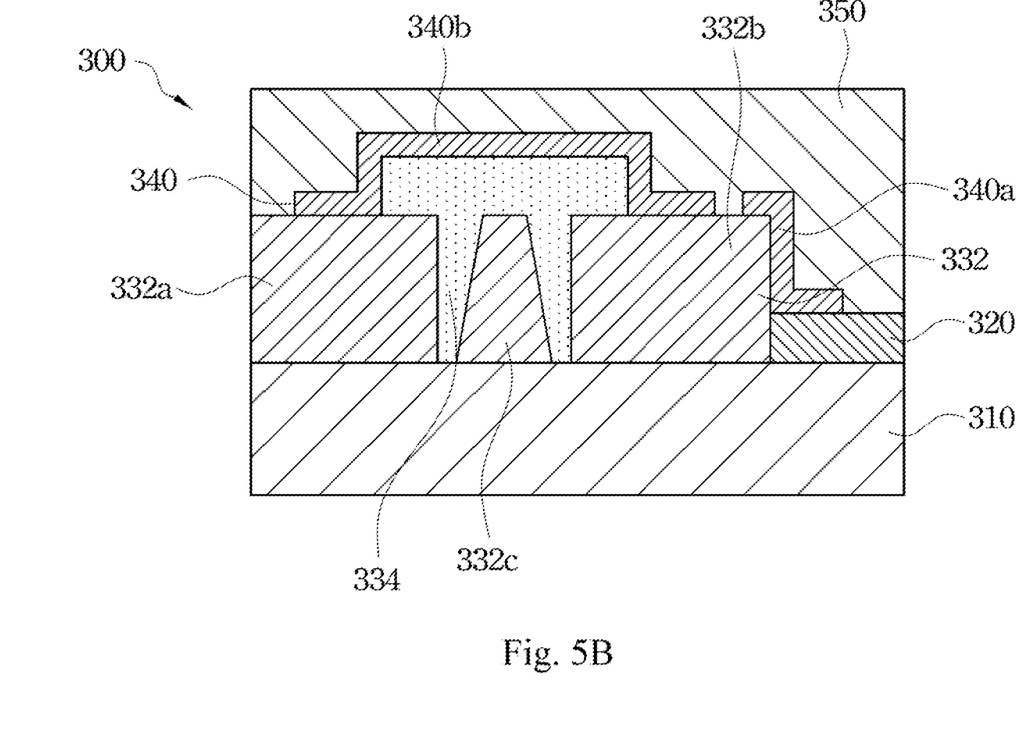
FIG. 5B is a cross-sectional view of the touch panel shown in FIG. 5A.

References are made to FIGS. 2 and 5B. FIG. 5B is a cross-sectional view of the touch panel 300 shown in FIG. 5A, and the profile position thereof can be referred to the line segment A-A shown in FIG. 2. In the touch panel 300, the substrate 310 may be a silicon substrate or a transparent substrate manufactured of other materials, and the shielding layer 320 is formed in the wiring area at the periphery of the substrate 310 through a lithography process. Subsequently, also through the lithography process, a transparent conducting layer 332 is formed on the substrate 310. The transparent conducting layer 332 includes plural electrode units 332a, 332b and 332c with rhombus or other forms. These electrode units 332a, 332b and 332c are arranged in series or lines. The electrode units 332c in alternate lines are connected to each other in the longitudinal direction (the direction of y-axis), and the electrode units 332a and 332b at left and right of the electrode units 332c arranged in lines are independent and inconspicuous patterns. Thereafter, the insulation layer 334 is formed on the transparent conducting layer 332, and part of the insulation layer 334 is filled in a gap between the electrode units of the transparent conducting layer 332.

Afterwards, the signal wire layer 340 is formed respectively on the sensitive layer 330 and the shielding layer 320. The signal wire layer 340b formed on the sensitive layer 330 is regarded as a bridge layer, and the pattern thereof is a bridge structure with long and narrow strip forms, so as to connect the electrode units 332a and 332b in a lateral direction (the direction of x-axis). As such, electrode series at the direction of x-axis and electrode series at the direction of y-axis can be obtained, and the electrode series at the direction of x-axis can be electrically isolated from the electrode series at the direction of y-axis through the insulation layer 334. The signal wire layer 340b formed on the shielding layer 320 includes wires, the grounding component and the test pad. Finally, the protecting layer 350 is further formed on the sensitive layer 330 and the signal wire layer 340.

Namely, the signal wire layer 340 includes plural bridge structures 340b formed on the insulation layer 334. The electrode units (such as the electrode units 332a and 332b) at the lateral direction of the transparent conducting layer 332 are electrically connected to each other through the plural bridge structures 340b. The insulation layer 334 is used for isolating the transparent conducting layer 332 and the bridge structures 340b of the signal wire layer 340, making the same being insulated electrically to each other.

Similarly, in another embodiment, the signal wire layer 340 may include a grounding component (not shown) formed on the shielding layer 320, and the grounding component includes plural hollow portions and plural conductive portions. The hollow portions and conductive portions are arranged alternatingly.

In this embodiment, also by adjusting the layer lamination sequence of the touch panel 300, the signal wire layer 340 is designed as manufactured after the sensitive layer 330. As such, the etching solution for etching the transparent conducting layer does not damage the metal layer manufactured thereafter, which prevent the problem of the prior art that the metal layer is etched by the etching solution.

In the touch panel provided by the invention, in addition to slicing metal blocks with large areas (such as the grounding component) to prevent the situation of metal peeling, the reliability of the touch panel is improved and the manufacturing steps of the sale is simplified by changing the sequence of the layer lamination structure.

Although the invention has been disclosed with reference to the above embodiments, these embodiments are not intended to limit the invention. It will be apparent to those of skills in the art that various modifications and variations can be made without departing from the spirit and scope of the invention. Therefore, the scope of the invention shall be defined by the appended claims.

What is claimed is:

1. A touch panel comprising:
a substrate;
a shielding layer formed only at the periphery of the substrate for defining a touch area and a wiring area surrounding the touch area, wherein the shielding layer is a light-shielding layer and comprises black photoresist;
a sensitive layer formed at the touch area, comprising a plurality of sensing units;
a signal wire layer formed on the sensitive layer and the shielding layer, wherein the signal wire layer comprises a first grounding component directly on the shielding layer, the first grounding component is only disposed on the shielding layer and comprises a plurality of first conductive strips and a plurality of reinforcing ribs laterally connecting the first conductive strips such that a plurality of first hollow portions are enclosed by the first conductive strips and the reinforcing ribs, wherein at least parts of the first hollow portions and at least parts of the first conductive strips are alternatingly arranged; and
a protecting layer formed on the sensitive layer and the signal wire layer.

2. The touch panel of claim 1, wherein a wire width of the first conductive strips is smaller than 60 μm, and a line spacing of the first hollow portions is smaller than 60 μm.

3. The touch panel of claim 1, wherein an area ratio of the first conductive strips to the first hollow portions is 0.6-1.4.

4. The touch panel of claim 1, wherein the signal wiring layer further comprises a test pad formed at the wiring area, and the test pad comprises at least one second conductive strips and second hollow portion.

5. The touch panel of claim 4, wherein the test pad directly touches the shielding layer.

6. The touch panel of claim 4, wherein the signal wiring layer further comprises:
a plurality of wires formed between the test pad and the first grounding component and connecting to the sensitive layer.

7. The touch panel of claim 6, wherein the signal wiring layer further comprises:
a second grounding component formed between the test pad and the wires, wherein the second grounding component comprises a plurality of third hollow portions and a plurality of third conductive strips, and at least parts of the third hollow portions and at least parts of the third conductive strips are alternatingly arranged.

8. The touch panel of claim 4, wherein the signal wiring layer further comprises:
a second grounding component formed between the test pad and the first grounding component, wherein the second grounding component comprises a plurality of third hollow portions and a plurality of third conductive strips, and at least parts of the third hollow portions and at least parts of the third conductive strips are alternatingly arranged.

9. The touch panel of claim 1, wherein the signal wiring layer further comprises:
a plurality of wires formed at the wiring area and being inside of the first grounding component and connecting to the sensitive layer.

10. The touch panel of claim 1, wherein the signal wiring layer further comprises:
a second grounding component formed at the wiring area and being inside of the first grounding component, wherein the second grounding component comprises a plurality of third hollow portions and a plurality of third conductive strips, and at least parts of the third hollow portions and at least parts of the third conductive strips are alternatingly arranged.

11. The touch panel of claim 10, wherein the signal wiring layer further comprises:
a plurality of wires formed between the second grounding component and the first grounding component and connecting to the sensitive layer.

12. The touch panel of claim 10, wherein the second grounding component directly touches the shielding layer.

* * * * *